July 29, 1958

M. BRUMA 2,845,520

MACHINING SYSTEMS MAKING USE OF INTERMITTENT
ELECTRICAL DISCHARGES
Filed Oct. 14, 1957

INVENTOR

MARC BRUMA

BY

Bailey, Stephens & Huettig
ATTORNEY

United States Patent Office 2,845,520
Patented July 29, 1958

2,845,520

MACHINING SYSTEMS MAKING USE OF INTERMITTENT ELECTRICAL DISCHARGES

Marc Bruma, Pavillons-sous-Bois, France, assignor to Centre National de la Recherche Scientifique, Paris, France, a state administration of France Application October 14, 1957, Serial No. 689,955

Claims priority, application France October 19, 1956

7 Claims. (Cl. 219—69)

The present invention relates to intermittent electrical discharge machining systems, that is to say to systems making use of the electrical erosion effect to machine pieces made of conductor metals or alloys, however hard they may be, by producing localized intermittent electrical discharges between the piece to be machined forming one electrode and another electrode acting as a machining tool and made of a conductor metal or alloy the hardness of which may be much lower than that of the piece.

The chief object of my invention is to provide a system of this kind which is better adapted to meet the requirements of practice than those known at the present time, in particular with a view to obtaining machined pieces having a more regular surface state, a higher accuracy in their dimensions, while maintaining a higher rate of machining during the operation.

The systems with which my invention is concerned include, to supply the intermittent discharges between the electrodes, an electrical energy accumulator itself charged periodically by a suitable source.

According to my invention, means operative by variations of the charging current fed by said source to said accumulator are provided to supply between the electrodes, at a given instant of every charging period, a voltage impulse which is superimposed on the voltage applied by said accumulator between said electrodes, whereby a machining discharge is started at said relative instant of each period.

Preferred embodiments of my invention will be hereinafter described with reference to the accompanying drawings, given merely by way of example and in which.

Figure 1:
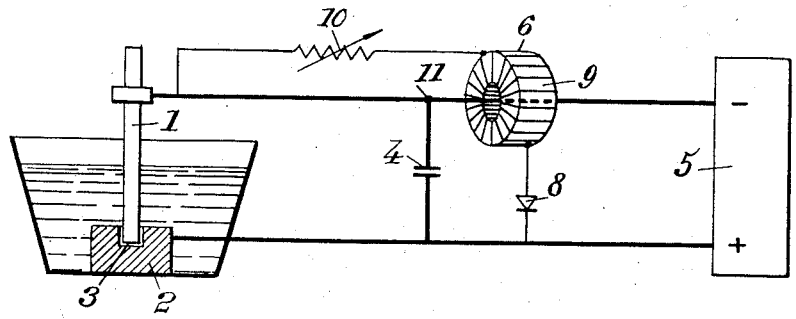
Fig. 1 is a diagrammatical view of a machining system according to my invention.

This system essentially includes a tool-electrode 1 mounted opposite the piece to be machined, which forms the other electrode, the space 3 between these two electrodes being filled with a suitable fluid. The two electrodes 1 and 2 are respectively connected with the terminal of a device for generating the machining discharges. This device includes an electric energy accumulator 4 (capacitor, delay line or the like), the energy being supplied by a source 5.

As soon as the voltage across the terminals of accumulator 4 exceeds a given value, this accumulator is discharged through the space 3 between the electrodes. Then a new charging period begins.

Figure 2:
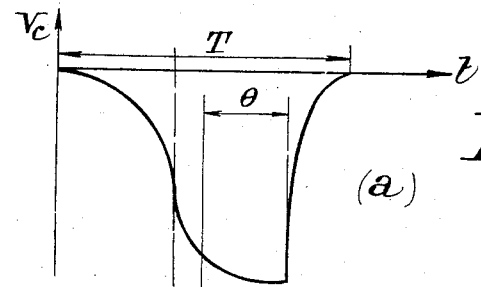
Fig. 2 shows curves illustrating the operation of the system of Fig. 1.
Figure 2:
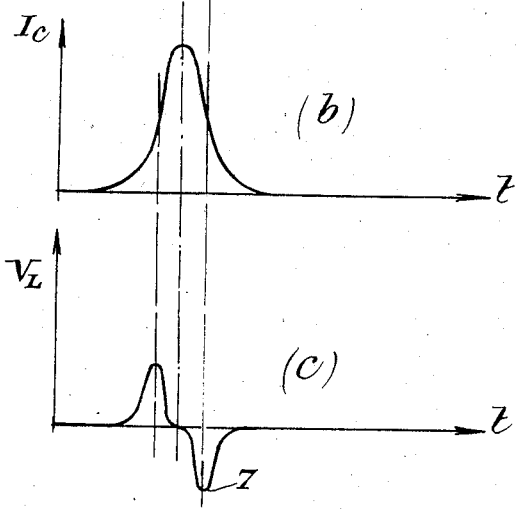

However the voltage across the terminals of accumulator 4 reaches its limit value in a slowly varying manner, as shown by the curve $a$ of Fig. 2 which indicates the variation of the voltage $V_c$ across the terminals of accumulator 4 as a function of time $t$.

This curve shows that, during the time interval $\theta$, the rate of increase of voltage $V_c$ is relatively low and tends toward zero at the end of said time interval $\theta$.

The instant at which the discharge is started is inside said interval $\theta$ but it is not accurately determined and the frequency of recurrence of the machining discharges is not very stable. The duration of the periods between two consecutive discharges may vary by 15% in more or in less with respect to a mean value, the time interval $\theta$ (Fig. 2) within which the discharge may take place corresponding to about 30% of the total period T.

Now, as the increase of the voltage across the terminals of accumulator 4 during this time $\theta$ is negligible, it is advantageous, in order to obtain a good machining efficiency, to start the discharge of accumulator 4 at the beginning of said time $\theta$: the subsequent recharging of said accumulator will then start earlier and it will be possible to obtain a greater number of discharges per unit of time.

Furthermore, if I thus more accurately regulate the voltage which produces the successive discharges, the machining effect that is obtained will be more regular, the state of the machined surface will be more homogeneous and the dimensions of the machined pieces will be more accurate.

In order to obtain an automatic regulation of the voltage and frequency of the discharges, I produce at a given instant of every charging period, this instant being always the same relatively to said period, a voltage impulse which is superimposed on the voltage supplied by accumulator 4 between the electrodes. Thus the discharge will be immediately produced.

In the embodiment illustrated by Fig. 1, accumulator 4 is constituted by a capacity C.

It is known that:

$$Q = CV_c \tag{1}$$

and that:

$$I_c = \frac{dQ}{dt} \tag{2}$$

where Q is the charge of the capacitor and $I_c$ its charging current. This charging current $I_c$ has a value proportional to the derivative with respect to time of the voltage $V_c$ across the terminals of capacitor 4

$$\left(I_c = C\frac{dV_c}{dt}\right)$$

and the curve representing the charging current is given at ($b$) in Fig. 2.

I provide a toroidal-shaped winding 6 coaxially mounted around the conductor through which passes said current $I_c$ so as to obtain, across the terminals of this winding, a voltage $V_L$ which is itself proportional to the derivative with respect to time of the inductor current $I_c$, in accordance with the formulas:

$$V_L \simeq n\frac{d\Phi}{dt} \simeq n\frac{dI_c}{dt} \tag{3}$$

in which $n$ is the number of turns of winding 6 and $\Phi$ is the induced flux which passes through said winding. The variations of $V_L$ have therefore the shape shown at ($c$) on Fig. 2.

This curve ($c$) has a maximum, shown at 7, which takes place substantially at the beginning of the time period $\theta$ above referred to.

If the voltage impulse corresponding to this maximum 7 is applied between the electrodes, with a sufficient amplitude and in the suitable direction, the slope of curve $V_c(t)$ (Fig. 2a) is considerably increased, which causes the discharge of capacitor 4 between the two electrodes.

The direction of this supplementary impulse is determined by a suitable choice of the relative directions of current $I_c$ and winding 6 and by making use of a unidirectional element 8 connected in series with said winding. The amplitude of this impulse is determined by a suitable choice of the number of turns of winding 6 and of the geometrical dimensions thereof, in accordance with the above indicated Formulas 3.

Advantageously, winding 6 includes a toroidal-shaped core 9 made of ferrite or any other suitable magnetic material, which permits of avoiding any excessive heating during the impulses, the winding itself being constituted by some hundreds of turns of a fine and insulated wire wound about this core.

The resistance of the circuit of winding 6 may be adjusted by means of a potentiometer 10 mounted in series.

Unidirectional element 8, which is to permit the passage of high frequency impulses is preferably a semi-conductor rectifier making use of germanium, silicon, etc.

This element 8 also permits of decoupling winding 6 with respect to the direct electric component which may be supplied by source 5. Therefore it must be capable of supporting a reverse voltage at least equal to that existing between the two electrodes.

Of course, the above described arrangement may be combined with other features which permit of improving the machining operation.

In particular, as indicated in my copending U. S. application filed recently and based upon the corresponding French patent application No. 723,287 of October 8, 1956, the wear of the tool may be reduced by causing the impulse of the discharge current to produce a voltage impulse capable of opposing, near the end of the machining discharge, the bombardment of the tool by the ions of the metal torn away from the piece during the beginning of this discharge.

For this purpose, I connect with the electrodes 1 and 2 a circuit analogous to that above described but in which the current acting on the winding would be the discharge current from capacitor 4, instead of being the charging current. In other words, this winding would be mounted on the left hand side of point 11 instead of being on the right hand side as shown by Fig. 1.

With the system according to my invention, the following advantages are obtained:

The portion of every machining period where the accumulator does not discharge is reduced so that the efficiency is increased;

The state of the machined surface is more regular;

The accuracy of machining is increased.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electrical discharge machining system which comprises, in combination, a tool forming an electrode mounted opposite a piece to be machined forming another electrode, means for generating successive discharges between said electrodes, said means including an electrical energy accumulator having its terminals connected with said electrodes respectively, and an electric source for supplying charging current to said accumulator during recurrent charging periods, and means operative by variations of said charging current to supply between said electrodes at a given instant of every charging period a voltage impulse superimposed on the voltage applied between said electrodes by said accumulator whereby the corresponding machining discharge is then produced.

2. An electrical discharge machining system which comprises, in combination, a tool forming an electrode mounted opposite a piece to be machined forming another electrode, means for generating successive discharges between said electrodes, said means including an electrical energy accumulator having its terminals connected with said electrodes respectively, an electric source for charging said accumulator and conductors mounted to connect the terminals of said source with the terminals of said accumulator respectively whereby said source periodically supplies charging current to said accumulator, and means coupled with at least one of said conductors for periodically supplying between said electrodes, in response to the variation of the charging current fed by said source to said accumulator, voltage impulses superimposed on the voltage supplied by said accumulator between said electrodes, whereby every machining discharge between said electrodes is caused to begin always at the same relative instant of every charging period.

3. An electrical discharge machining system which comprises, in combination, a tool forming an electrode mounted opposite a piece to be machined forming another electrode, means for generating successive discharges between said electrodes, said means including an electrical energy accumulator having its terminals connected with said electrodes respectively, an electric source for charging said accumulator and conductors mounted to connect the terminals of said source with the terminals of said accumulator respectively whereby said source periodically supplies charging current to said accumulator, a winding mounted coaxially about one of said conductors, and a circuit, including said winding inserted in series therein, said circuit being mounted between said electrodes, for periodically supplying between said electrodes, in response to the variation of the charging current fed by said source to said accumulator, voltage impulses which are superimposed on the voltage supplied by said accumulator between said electrodes, whereby every machining discharge between said electrodes is caused to begin always at the same relative instant of every charging period.

4. A system according to claim 3 in which said electric circuit includes at least one unidirectional element.

5. A system according to claim 3 in which said electric circuit includes a semi-conductor rectifier.

6. A system according to claim 3 further including a potentiometer mounted in series in said electric circuit.

7. A system according to claim 2 in which said winding includes a core of ferrite.

No references cited.